June 10, 1930.  C. B. FRANKLIN  1,763,096
FRONT WHEEL BRAKE MOUNTING FOR MOTOR CYCLES
Filed Aug. 10, 1928
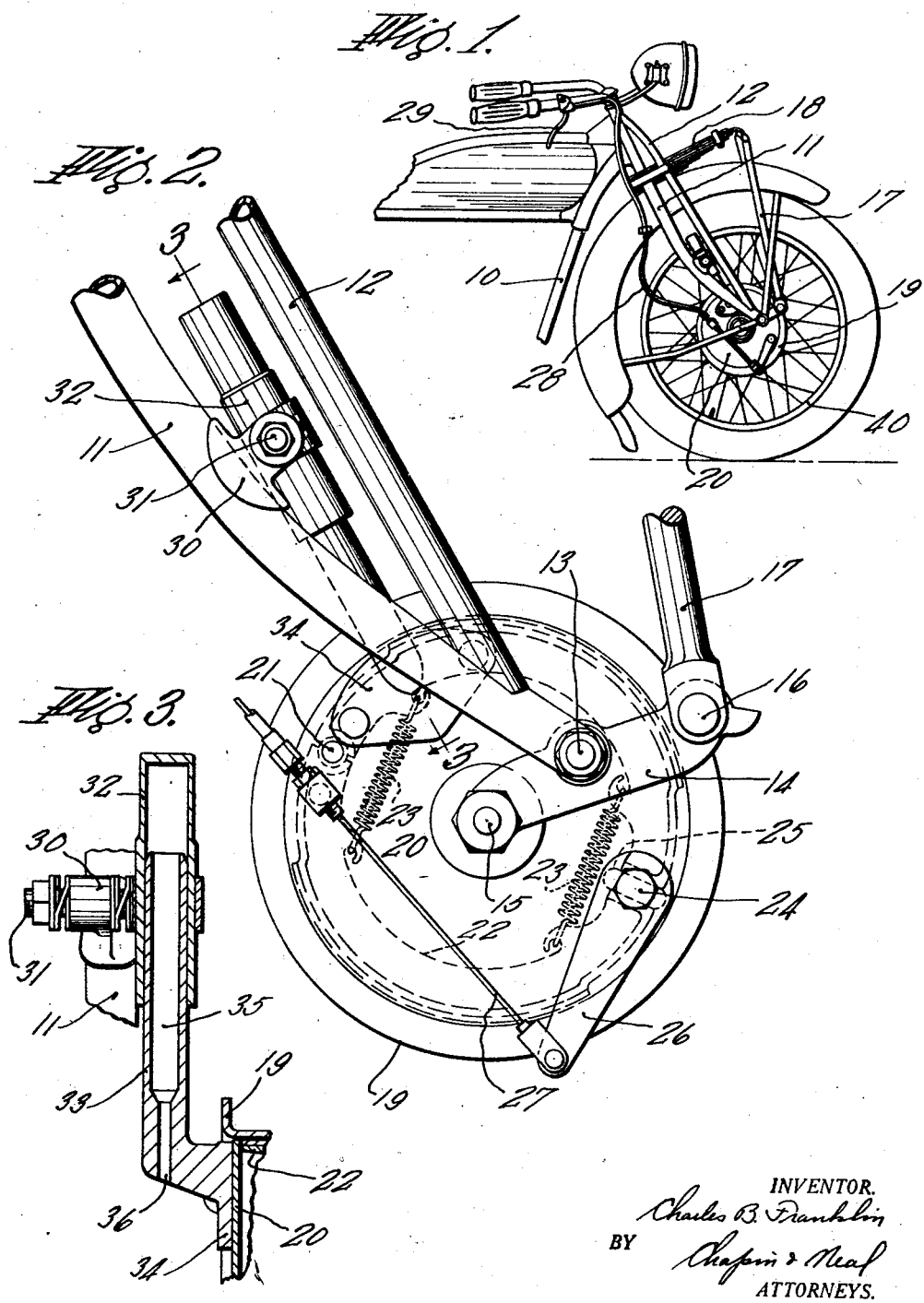
INVENTOR.
Charles B. Franklin
BY Chapin & Neal
ATTORNEYS.

Patented June 10, 1930

1,763,096

UNITED STATES PATENT OFFICE

CHARLES B. FRANKLIN, OF SPRINGFIELD, MASSACHUSETTS, ASSIGNOR TO INDIAN MOTOCYCLE CO., OF SPRINGFIELD, MASSACHUSETTS, A CORPORATION OF MASSACHUSETTS

FRONT-WHEEL-BRAKE MOUNTING FOR MOTOR CYCLES

Application filed August 10, 1928. Serial No. 298,693.

My invention relates to front wheel brake mountings for motorcycles and has particular reference to a brake mounting adapted for that type of motorcycles in which the front wheel is spring mounted with respect to the frame so that the wheel is free to execute riding vibrations relative to the frame. In motorcycles of this character, the mounting of the stationary or brake-action imparting member of the brake has given rise to difficulties on account of the fact that the wheel both rotates and reciprocates with respect to the frame. It is the object of my invention to provide a brake mounting which will permit the necessary reciprocating motion but will, at the same time, prevent relative rotation of the stationary brake member and the frame. It is a further object of my invention to provide a mounting of this character which will not interfere with the dismounting of the front wheel of the motorcycle when necessary for repairs or for tire replacement.

Referring to the drawings:

Fig. 1 is a partial side elevation of a motorcycle to which my invention has been applied;

Fig. 2 is a side elevation on an enlarged scale of portions of the mechanism shown in Fig. 1; and Fig. 3 is a section on line 3—3 of Fig. 2.

The motorcycle shown in Fig. 1 is provided with a rigid frame 10, in which is pivoted the front fork, each branch of which is here shown as formed, for reasons of stiffness, by members 11 and 12 joined at their upper and lower ends. At the lower end of each branch of the front fork is a pivot 13 upon which swings freely a double-arm lever 14. Each of the arms of this lever bears pivots 15 and 16. Pivot 15 forms the axle about which the front wheel 40 rotates. The pivot 16 of each lever is joined to a link 17 which at its upper end is pivoted to a leaf spring 18 firmly fastened to the front fork. By means of this mounting the front wheel is permitted to move relatively to the fork as permitted by the spring 18 and still is restricted in its motion in case of breakage of the spring so that the front fork cannot drop more than a short distance.

Firmly attached to the hub of the front wheel is a brake drum or brake-action receiving member 19. Rotatably mounted on the axle and concentric with the brake drum is a brake-action imparting member 20 having at one side a pivot 21 upon which brake shoes 22 are mounted. In the case shown, the brake is of the internal expanding type and therefore these brake shoes lie within the brake drum 19. Springs 23 normally hold the brake shoes out of contact with the brake drum.

At a point opposite the pivot 21 is a second pivot 24 bearing a cam 25, adapted to engage the free ends of the brake shoes and to force them apart when it is desired to apply the brake. Fast upon the pivot 24 is a lever 26 to the end of which is attached a flexible cable 27 running through a flexible tube 28 and operable by means of a handle 29.

When the brake shoes are expanded into contact with the brake drum it is, of course, necessary to prevent their rotation with the wheel in order to produce the desired friction. For this purpose I provide means for preventing all but a slight rotation of the brake-action imparting member 20 while permitting it to vibrate with the wheel on the spring mounting described above. Upon one of the fork members 11 is mounted a bracket 30 bearing a pivot 31. A cylinder 32 is secured to the pivot 31 so that it may swing freely. Sliding within the cylinder 32 is a piston 33 connected rigidly at its lower end to a plate 34 forming part of the brake-action imparting member 20. The piston is preferably made hollow as at 35 and is vented to the atmosphere by means of a hole 36 in order to avoid hindrance of its free vibratory play by air compressed within the cylinder 32. Instead of the described cylinder-piston connection between the frame and the brake action imparting member, any other telescopic or other connection suited for the purpose may be employed, for instance, a stud engaging a slot.

The mounting constructed as described above will permit the wheel to rotate freely and to reciprocate with respect to the front fork as permitted by its spring mounting. The brake supporting member 20, however, while partaking of the reciprocating movement of the wheel is prevented from rotating by means of the coaction of the piston 33 and the cylinder 32. During the normal operation of the motorcycle there is, of course, no tendency for the brake supporting member to rotate. When the brake is applied, however, this member tends to turn with the wheel and it is at this time that the restricting action of the piston and cylinder comes into play. A further advantageous feature of this construction is that the telescopic connection of the piston and the cylinder offers no impediment to the dismounting of the wheel, since the piston can be drawn freely out of the end of the cylinder. It is therefore not necessary to disassemble any of the parts forming the mounting whenever the front wheel is to be temporarily removed.

What I claim is:

1. In a motorcycle of the type having a frame and a front wheel vertically movable with respect to the frame, a brake drum rotatable with the wheel, a brake supporting member, brake elements supported by the member and coacting with the brake drum, a casing pivoted to the frame, and a plunger fastened to the brake supporting member and reciprocable within the casing.

2. A front wheel brake mounting for motorcycles, a brake drum secured to the wheel, a brake holding member, brake elements supported by said member and coacting with the brake drum, and a sliding coupling between the member and the fork allowing the member and the frame to move rectilinearly but not rotatively with respect to each other.

3. A front wheel brake mounting for motorcycles comprising a wheel hub, a wheel rotatable on the hub, a brake drum secured to the wheel, a brake supporting member, brake elements supported by said member, and a sliding coupling between the member and the rigid frame whereby the member and the frame may move rectilinearly but not rotatively with respect to one another.

4. In a motorcycle of the type having a frame and a front wheel vertically movable with respect to the frame, a brake drum rotatable with the wheel, a brake supporting member, brake elements supported by the member and coacting with the brake drum, and an open ended sliding connection between the member and the frame permitting relative reciprocating of the member and the frame but preventing their relative rotation, and permitting the ready removal of the wheel without dismounting any of the parts forming the connection between the member and the frame.

5. In a motorcycle of the type having a frame and a front wheel vertically movable with respect to the frame, a brake drum rotatable with the wheel, a brake supporting member, brake elements supported by the member and coacting with the brake drum, a cylindrical casing pivoted to the frame, a piston secured to the brake supporting member and reciprocable within the casing, and a vent connecting the interior of the cylinder to the atmosphere.

6. The combination with a vehicle comprising a wheel free to execute riding vibrations relative to the vehicle frame, a brake-action receiving member fixed to the wheel, and a coacting brake-action imparting member, of connecting means between said brake-action imparting member and the vehicle frame consisting of two respectively attached and telescopically engaging elements for preventing said brake-action imparting member from turning with the wheel without hindering the free vibratory play thereof.

7. The combination with a vehicle comprising a wheel free to execute riding vibrations relative to the vehicle frame, a brake-action receiving member fixed to the wheel, and a coacting brake-action imparting member, of connecting means between said brake-action imparting member and the vehicle frame consisting of two respectively attached and telescopically engaging elements, one element being pivotally mounted for preventing said brake-action imparting member from turning with the wheel without hindering the free vibratory play thereof.

In testimony whereof I have affixed my signature.

CHARLES B. FRANKLIN.